United States Patent [19]

Rowe

[11] 4,101,604
[45] Jul. 18, 1978

[54] UNSATURATED POLYESTER MOLDING COMPOSITIONS

[75] Inventor: Eugene Hugh Rowe, Akron, Ohio

[73] Assignee: The B. F. Goodrich Company, Akron, Ohio

[21] Appl. No.: 816,230

[22] Filed: Jul. 18, 1977

[51] Int. Cl.$^2$ ............................................. C08L 67/06
[52] U.S. Cl. ................... 260/862; 260/40 R; 260/842; 260/850; 260/857 PE; 260/861
[58] Field of Search .............. 260/861, 857 PE, 40 R, 260/2.5 N, 862

[56] References Cited

U.S. PATENT DOCUMENTS

| 3,225,115 | 12/1965 | McGary | 260/861 |
| 3,327,019 | 6/1967 | Mylenbusch | 260/861 |
| 3,644,568 | 2/1972 | Tilley | 260/835 |
| 3,725,461 | 4/1973 | Jamison | 260/861 |
| 3,740,372 | 6/1973 | Baum | 260/861 |
| 3,814,718 | 6/1974 | Busch | 260/861 |
| 3,926,902 | 12/1975 | Bowen | 260/861 |

FOREIGN PATENT DOCUMENTS 1,387,583  3/1975  United Kingdom.

*Primary Examiner*—Paul Lieberman
*Attorney, Agent, or Firm*—Joe A. Powell; J. Hughes Powell, Jr.

[57] ABSTRACT

Unsaturated molding compositions containing an unsaturated polyester resin, a polymerizable monomer, an epihalohydrin polymer, and optionally, reinforcing fibers, catalyst, thermoplastic polymers, thickening agent and fillers. The epihalohydrin polymer improves the toughness of the molding composition.

33 Claims, No Drawings

UNSATURATED POLYESTER MOLDING COMPOSITIONS

BACKGROUND OF THE INVENTION

Thermosetting unsaturated polyester resin based molding compounds are well known and consist of an unsaturated polyester resin, an ethylenically unsaturated copolymerizable monomer, inert mineral fillers, fibrous reinforcing fillers and a catalyst which initiates the cross-linking reaction between the copolymerizable monomer and the unsaturated polyester resin at a chosen molding temperature. They are commonly used in many physical forms two of which are bulk molding compounds (BMC) and sheet molding compounds (SMC). In bulk molding compounds, the fibrous reinforcing filler which is normally about 0.25 inch in length, is mechanically mixed with unsaturated resin. In sheet molding compounds, the fibrous reinforcing filler which is normally about 0.5 to 2 inches in length, is present as chopped fibers deposited on a supporting carrier which are impregnated with the unsaturated resin system, giving rise to sheets of molding compound in which the fibers have not been subjected to the degrading action of conventional molding compound mixers.

The use of unsaturated polyester resins in the molding of glass fiber reinforced or other fiber reinforced products enjoys broad application in the manufacture of automotive, industrial and home products.

Polyester molding compounds are described in U.S. Pat. Nos. 3,940,350, 3,974,124, 3,227,665, 3,701,748 and 3,948,716.

Unfortunately, polyester resins are inherently brittle and whenever unsaturated polyester resins are used as a matrix, then the toughening of the matrix is important. Normal industry practice is to add a flexibilizer to the resin composition which often results in a significant reduction in the mechanical properties. This reduction in mechanical properties is unacceptable for many product applications. It is desirable to toughen unsaturated polyester resin compositions without significant adverse effects on other important properties such as cure rate, maturation and strength.

SUMMARY OF THE INVENTION

To an unsaturated polyester molding composition containing unsaturated polyester resin(s) and polymerizable monomer(s) is added from about 1 to about 30 parts by weight of an epihalohydrin polymer per 100 parts by weight of the combined weight of the polyester resin and the polymerizable monomer. The composition containing the epihalohydrin polymer is greatly improved for toughness without significant adverse effects on strength and processing characteristics such as cure rate and maturation.

DETAILED DESCRIPTION

Polyesters useful in this invention are well known in the art and include those derived by condensation of unsaturated dibasic acids or anhydrides containing 4 to 9 carbon atoms with polyols including dihydroxy and trihydroxy compounds containing 2 to 12 carbon atoms. The polyester may include in the polymeric chain varying proportions of other saturated or aromatic dibasic acids and anhydrides which are not subject to cross-linking. The particular noncross-linking moieties and their proportions will depend upon the desired properties of the final product. Maleic, chloromaleic and fumaric acid may be mentioned as exemplary of unsaturated dibasic acids. Aromatic and saturated acids and anhydrides which are exemplary of noncross-linking moieties within the copolymer include: phthalic anhydride, endomethylene-tetrahydrophthalic acid, tetrachlorophthalic acid, hexachloroendomethylenetetrahydrophthalic acid, adipic acid, sebacic acid, succinic acid, and the like.

Any of a variety of well known polyols including di- and tri- hydroxy compounds containing 4 to 9 carbon atoms, preferably 4 to 6 carbon atoms can be used for condensation with the diacids to produce polyesters suitable for use in this invention. Preferred compounds, which are mentioned by way of example, of the large number of applicable compounds include: ethylene glycol, diethylene glycol, propylene glycol, polypropylene glycol, glycerol, 1,2-, 1,3-, and 1,4-butadienols, trimethylol propane, and the like. The method by which the unsaturated polyester resins are made is not critical to this invention.

The polyester resin is dissolved in a solvent comprising at least one polymerizable monomer which is copolymerizable with the dissolved polyester. The polymerizable monomer not only acts as a solvent but also copolymerizes with the unsaturated groups along the polyester chain. Polymerizable monomers which can be used in this invention include polymerizable vinylidene compounds having at least one terminal $CH_2<$ group and containing 2 to 12 carbon atoms, preferably 3 to 10 carbon atoms. A wide variety of these compounds are known including both aliphatic and aromatic unsaturated hydrocarbons and hydrocarbon derivatives, such as esters, acids and nitriles. Examples of suitable polymerizable monomers are styrene, methyl styrene, acrylonitrile, methyl acrylate, methyl methacrylate, vinyl acetate, allyl esters of phthalic, adipic, maleic, malonic, and cyanuric acids. Styrene and methyl styrene are particularly useful polymerizable monomers. Commerical unsaturated polyester resins are normally sold as a liquid solution with the unsaturated polyester resin dissolved in the polymerizable monomer.

Epihalohydrin polymers used as toughners in this invention can be an epihalohydrin homopolymer, a copolymer of two or more epihalohydrin monomers, or a copolymer of an epihalohydrin monomer(s) with an oxide monomer(s).

The epihalohydrin monomers have the formula

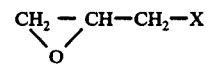

where $x$ is Cl, Br, I, or F. More preferredly, $x$ is selected from Cl and Br. From a cost and availability standpoint, the preferred monomer is epichlorohydrin. Other halogen-bearing epoxide monomers can be used in partial replacement of the epihalohydrin monomer(s). Examples of these monomers are 4-chloro-1,2-epoxy butane; 4-bromo-1, 2-epoxy butane; 1-(1,3-dichloroisopropoxy)-2,3-epoxypropane; 4,4,4-trichloro-1,2-epoxy butane; 1-bromoethyl glycidyl ether; 1,1,1-trichloroethyl glycidyl ether; 1,1,1-trifluoroethyl glycidyl ether; 1,2-epoxy-2-methyl-4,6,6,6,-tetrachlorohexane; 1,2-epoxy-4-oxo-8,8,8-trichlorooctane; and the like.

The oxide monomers contain a cyclic oxy

ring therein. Examples of these monomers are alkylene oxides such as ethylene oxide, propylene oxide, butylene oxide, isobutylene oxide, octylene oxide, and the like; cycloaliphatic oxides such as cyclohexene oxide, vinyl cyclohexene oxide, and the like; glycidyl ethers such as methyl glycidyl ether, ethyl glycidyl ether, isopropyl glycidyl ether, n-hexyl glycidyl ether, phenyl glycidyl ether, and the like; glycidyl acrylate and glycidyl methacrylate; allyl glycidyl ether; styrene oxide; and 4- and 5- membered oxy ring compounds such as Furan and methyl substituted Furan, and the like. Of the oxide monomers, the alkylene oxides containing two to about eight carbon atoms are preferred.

Examples of more preferred epihalohydrin polymers are polyepichlorohydrin, polyepibromohydrin, epichlorohydrin-epibromohydrin copolymer, epichlorohydrin-ethylene oxide copolymer, epibromohydrin-ethylene oxide copolymer, epichlorohydrin-propylene oxide copolymer, and epichlorohydrin-ethylene oxide-propylene oxide terpolymer. Excellent results have been obtained with a homopolymer of epichlorohydrin.

Copolymers of epihalohydrin monomers and oxide monomers comprise at least 50% to 100% by weight (i.e., homopolymers) of polymerized units of epihalohydrin monomer(s), and up to 50% by weight of polymerized units of an oxide monomer(s). Preferably, the polymers contain from about 65% to 100% by weight of polymerized epihalohydrin monomer(s).

Epihalohydrin polymers suitable for use as tougheners for unsaturated polyester resins are of low molecular weight and will vary in form from fluid liquids to thick semisolids. The number average molecular weight (Mn) of such polymers normally will vary from about 800 to about 50,000, preferably from about 2000 to about 15,000. The molecular weight is normally specified in terms of "Reduced Solution Viscosity" or "RSV" which is a point value viscosity determined as the viscosity at 25° C of a solution of 0.4 gram of polymer dissolved in 100 ml. of dimethyl formamide containing 3% by volume of acetylacetone (expressed as deciliter per gram or dl./g.). The range of RSV corresponding to the number average molecular weight range given above will be from about 0.025 to about 0.5, preferably from about 0.075 to about 0.3. The epihalohydrin polymers have a bulk viscosity of from about 500 cps. to about 50,000,000 cps (measured at 27° C using a Brookfield Viscometer). To facilitate handling, the bulk viscosity of the epihalohydrin polymer can be reduced by blending the polymer with the dissolving polymerizable monomer. This may be desirable for high viscosity polymers. Liquid epichlorohydrin polymers were found to be excellent tougheners for unsaturated polyester resins.

Epihalohydrin polymers suitable for use in this invention can be prepared according to U.S. Pat. No. 3,850,856 (incorporated herein by reference) and U.S. Pat. No. 3,850,857 (incorporated herein by reference).

The level of epihalohydrin polymer(s) used is from about 1 to about 30 parts by weight, preferably from about 1 to about 15 parts by weight, said weight parts being based on 100 parts by weight of the polyester resin and the polymerizable monomer.

In addition to the polyester resin, the polymerizable monomer and the epihalohydrin polymer, the molding compositions of this invention may include other ingredients such as fillers, mold lubricants, catalysts, thickening agents, low profile additives, reinforcing fibers, flame and smoke retardants, and coloring agents.

As regards the filler materials suitable for use in the compositions of this invention, these may include conventional inorganic fillers such as carbonates, sulfates, phosphates, silica, silicate, micromica, carborundum, asbestos, glass, sandstone, graphite and the like reduced to a fine powder, as well as organic materials such as polyolefins, polyvinyl chloride, carbon black and acetylene black, polyacrylate, polymethacrylates, solid polyesters, phenol-formaldehyde resins, urea-formaldehyde resins, polyformol resins, polyamid resins, used in powder of appropriate granulometric composition ranging from very fine powder to granular size. The particles may sometimes fuse during the final cross-linking process.

Organic or inorganic bubbles may be used as fillers to reduce the weight of the unsaturated polyester compositions. Hollow glass bubbles are particularly desirable as a weight reducing filler. The glass bubbles have a nominal density less than 0.7 and preferably less than 0.5 grams per cubic centimeters. They are of small particle size of from about 1 to about 500 microns and preferably less than 150 microns.

As reinforcing fibers, there may be used inorganic fibers such as glass fibers, asbestos fibers; vegetable fibers such as flax, hemp, cotton, and the like; and organic fibers such as nylon, polyester, aromatic polyamide and the like. The reinforcing fibers may be present as chopped fibers having lengths of from about 0.1 to about 3 inches or as woven mats, non-woven mats and the like. Sheet molding compounds will normally have chopped fibers of from about 0.5 to about 2 inches. The quantity of reinforcing fibers used will normally be from about 5 to 70 percent, preferably from 15 to 50 percent of fibers of the total weight of the composition.

Mold lubricants which may be employed in the preparation of the compositions of this invention include mold lubricants well known in the art and the choice is not critical. There may be mentioned, by way of example, zinc stearate, calcium or magnesium stearate or oleate and zinc oleate. In some instances, the mold lubricant may be omitted as where organic fillers having the property of being self-lubricating, such as polyolefins, polyvinylchloride and the like are employed.

Known chemical thickeners are the oxides and hydroxides of the metals of main group 2 of the periodic system, preferably the oxides and hydroxides of magnesium and calcium, to which small amounts of water are added optionally. Magnesium oxide was found to be an especially desirable thickener. The thickeners are normally used at levels of from about 1 to about 3 parts by weight per 100 parts of the combined weight of polyester resin and polymerizable monomer.

Examples of suitable catalysts are benzoyl peroxide, tertiary butyl peroxide, cyclohexanone peroxide, tertiary butyl peroctoate, tertiary butyl perbenzoate, azoisobutyrodinitrile, cumene hydroperoxide and the like. The catalyst are normally used at levels of from about 0.5 to about 3 parts by weight per 100 parts of the combined weight of polyester resin and polymerizable monomer.

Many applications for which unsaturated polyester compositions are used are not critical with respect to surface smoothness, but in certain uses such as automobile surface parts, for example, the characteristic rough surface is objectionable. Often it is desirable to paint moldings used in automotive applications, for example, to achieve a smooth, metal-like, high-gloss appearance. To achieve a smooth surface, it is customary to use a low-shrink additive, which is commonly referred to as a low-profile additive. Low-profile additives are widely used in sheet molding compounds.

Low-profile additives which may be used in the unsaturated polyester resin compositions of this invention are well known in the art. They include thermoplastic homopolymers of vinylidene monomers containing 2 to 12 carbon atoms. Examples are homopolymers of alkyl acrylates and methacrylates such as methyl acrylate, ethyl acrylate, methyl methacrylate, ethyl methacrylate, butyl methacrylate and the like; vinyl esters such as vinyl acetate and the like; vinyl halides such as vinyl chloride and the like; vinyl aromatics such as styrene and the like. Thermoplastic copolymers are also suitable for use as a low-profile additive such as copolymers of methyl methacrylate and lower alkyl esters of acrylic and methacrylic acids, and copolymers of methyl methacrylate with minor amounts of one or more of the following: lauroyl methacrylate, isobornyl methacrylate, acrylamide, hydroxyethyl methacrylate, styrene, 2-ethylhexyl acrylate, acrylonitrile, methacrylic acid, methacrylamide, methylol acrylamide and cetyl stearyl methacrylate. Copolymers of vinyl halides and vinyl esters are also useful as low-profile additives such as vinyl chloride/vinyl acetate copolymers and the like. Other useful examples of low-profile additives are styrene/acrylonitrile copolymers, cellulose acetate butyrate, and cellulose acetate propionate. Excellent results were obtained using polyvinyl acetate.

Low-profile additives are normally supplied in a solution with a polymerizable monomer such as styrene. After cure, the low-profile additive exists as fine particles dispersed in the polyester matrix. Low-profile additives may be used at a level of from about 5 to about 40 parts by weight based on 100 parts by weight of the combined weight of the unsaturated polyester resin and the polymerizable monomer.

To prepare the novel molding compositions of this invention, normal procedures for preparing unsaturated polyester molding compositions are used except that the epihalohydrin liquid polymer is mixed with the polyester resin and polymerizable monomer. The remainder of the preparation procedure will vary somewhat depending on the type of molding composition desired, such as sheet molding, bulk molding, hand lay-up, spray-up, vacuum bag molding, injection molding, casting and the like.

For sheet molding compounds a typical preparation procedure is to first mix the liquid ingredients together, that is the unsaturated polyester resin, polymerizable monomer, low-profile additive and the epihalohydrin polymer. The epihalohydrin polymer may be added as is or mixed with the polymerizable monomer to reduce its viscosity and facilitate handling. The liquid ingredients are then mixed with the fillers and mold release agents for about 15 to 20 minutes in a mixer such as a Cowles mixer. The catalyst is then added to the mix and mixed for about 2 to 5 minutes. The thickening agent is then added and mixed for about 1 to 3 minutes. The resin composition is then spread onto nonadhering sheets such as polyethylene. Chopped glass fibers are then sprayed onto the sheets of resin compound and the sheets brought together to form a composite. The composite is passed through compression rollers to effect impregnation of the glass by the resin mix. The sheets of the composite are then allowed to thicken with time (maturation) for about 1 to 3 days at about 32° C. For sheet molding applications, the resin composition should thicken to a viscosity of from about $30 \times 10^6$ cps to about $100 \times 10^6$ cps. Preferably from about $50 \times 10^6$ cps to about $70 \times 10^6$ cps before molding under heat and pressure. The thickened sheets are then cut into the desired size and molded and cured at an elevated temperature.

Initial compatibility of the polymer with the polyester resin and polymerizable monomer is important to produce the desired morphology. Quite unexpectedly, it was found that when the epihalohydrin polymer is mixed with the polyester resin and the polymerizable monomer, the polymer appears to dissolve and becomes compatible with the mix. This phenomenon is unusual since other liquid polymers such as liquid acrylonitrile/butadiene polymer would not readily dissolve in the resin mix. When the rubber polymer is incompatible with the resin mix, there can be no control of rubber particle size beyond mixing conditions and speed of processing. Therefore, the rubber domains are large (greater than 10 microns). When the compatible epihalohydrin polymer is used as a toughener for polyester resins, the rubber domains are very small (from submicron to 10 microns in size) which is desirable for toughness improvement. The unexpectedly small particles of epihalohydrin polymer in the polyester is believed to result from its compatibility and subsequent precipitation at the onset of resin gelation.

Since the epihalohydrin is compatible with the unsaturated polyester resin mix, the compositions of this invention have excellent storage properties. When an incompatible polymer is used in the mix and the mix is not used within a short time after mixing, the polymer has a tendency to separate from the mix. The epihalohydrin, polyester resin and polymerizable monomer of this invention can be premixed and stored for long periods of time before the catalyst and thickening agent are added to the mix. This is a very desirable feature for unsaturated polyester molding compositions.

In order to evaluate the compositions of this invention for toughness and other properties, standard industry tests may be used. ASTM tests can be used for conventional mechanical properties such as D-790 for flexure and D-638 for tension, both with nominal 6.35 mm thick samples. Izod testing was done on samples that were unnotched and impacted normal to the molding surface. Other tests were used to measure shrinkage in the mold and Barcol hardness. Fracture toughness was evaluated by the Gardner dart impact test and by an acoustic emission test designed to measure crack development during bending. The Gardner impact and acoustic emission tests warrant more detailed description.

For the Gardner impact test, an instrument is used which comprises a base plate, a round-nosed steel rod impact weight, a slotted tube having inch-pound graduations in which the rod is lifted and dropped, and a bracket to hold the tube in a vertical position. Impact resistance is determined by subjecting either side of a sample panel to an impact of up to 320 inch-pounds, depending upon the weight dropped. The sample panel is placed over a 12.7 mm hole in the base plate; the steel rod weight is raised by lifting an attached pin until the pin coincides with the desired inch-pounds graduation mark on the slotted tube, and then dropped. The sample panel is examined for cracking or failure after each impact. The test used a 1.59 mm radius dart on a 6.35 mm sample panel. A two-pound weight was dropped from various heights onto the ring supported sample. The resultant damage was determined by detecting cracking on the reverse side of the sample. The detection was made relatively easy by inking the reverse side and then wiping it clean; the ink clearly identified the local cracking from the impact. The dart weight multiplied by the drop height at the onset of detectable cracking determined the reported Gardner impact value in inch-pounds.

The acoustic emission test was devised to measure cracking during a simple cantilever bending load. In it, a 3.18 mm thick sample, 38 mm wide and 127 mm long is mounted in a Tinius Olsen Stiffness Tester and bent by applying a weight of 22.7 kg. The sample bent until 70% of the weight was applied to it. The load caused the sample to bend through 6° – 7° of measured arc. A dynamic microphone was mounted in contact with the specimen at the point of maximum arc. A tape recorder was used to record the noise of crack development during the bending sequence. This record can be played back for an audible comparison of different samples. At the same time, the tape output can be fed into an oscilloscope for a visible record of the cracking noise. The oscilloscope trace can be photographed to record the test. A numerical value for the acoustic emission test is determined by counting the number of peaks from the oscilloscope trace.

The novel compositions of this invention containing epihalohydrin may be used in any of the many unsaturated polyester molding applications, but for illustrative purposes, the examples are directed to unsaturated polyester sheet molding.

The following examples illustrate the present invention more fully.

EXAMPLE I

This example is presented to show the improvement in toughness imparted to an unsaturated polyester sheet molding compound by the use of a liquid polyepichlorohydrin polymer. A compound containing no liquid rubber (control) and a compound containing a liquid acrylonitrile/butadiene rubber (sample 2) are compared with the compound containing liquid polyepichlorohydrin (sample 1).

TABLE I

| Ingredient (Parts by Weight) | Control | Sample 1 | Sample 2 |
|---|---|---|---|
| Unsaturated Polyester Resin[1] | 65 | 65 | 65 |
| Low-profile additive[2] | 35 | 35 | 35 |
| Calcium Carbonate[3] | 126 | 126 | 126 |
| Zinc Stearate | 3.9 | 3.9 | 3.9 |
| t-butyl Perbenzoate | 1.18 | 1.18 | 1.18 |
| MgO | 0.9 | 0.8 | 0.8 |
| Liquid Polyepichlorohydrin[4] | — | 4.0 | — |
| Liquid Acrylonitrile/butadiene[5] | — | — | 4.0 |

[1] An isophthalic unsaturated polyester resin in a 40% styrene solution supplied by PPG under the trade name of Selection 50271
[2] A low profile additive supplied by Union Carbide consisting of 40% polyvinylacetate in a 60% styrene solution
[3] Mean particle size of 2.5 microns
[4] A polyepichlorohydrin prepared according to U.S. Patent 3,850,856 and having a number average molecular weight of about 6,000
[5] A liquid polymer containing 33% acrylonitrile The compositions were prepared by mixing the polyester resin, low-profile additive (both of which were dissolved in a polymerizable monomer), calcium carbonate, zinc stearate and liquid polymer (in samples 1 and 2 only). The liquid ingredients (polyester resin, low-profile additive and rubber) were first mixed together. The liquid ingredients were then mixed with the calcium carbonate and zinc stearate in a Cowles mixer for 15 minutes and then the t-butyl perbenzoate catalyst was added to the mix and mixing continued for 3 minutes. The MgO was then added and mixing continued for 2 minutes. The compositions were then spread onto sheets of polyethylene and chopped glass fibers (1¼ inch long) was sprayed onto the compositions. The sheets were brought together to form a composite. The composite was passed through compression rollers to effect impregnation of the glass fibers by the resin mix. The quantity of chopped glass fibers used was such that the final sheet molding compositions were 21% glass. The compositions were then rolled up in the polyethylene and allowed to thicken for about 48 hours at 32° C. The sheets were then cut into sample size and cured for 3 minutes at 150° C in a 50 ton press. Testing results are shown in Table II.

TABLE II

| TEST | Control | Sample 1 | Sample 2 |
|---|---|---|---|
| % Shrink | 0 | 0 | 0 |
| Barcol Hardness | 48 | 38 | 29 |
| Gardner Impact (in.-lb) | 6 | 10 | 6 |
| Unnotched Izod (ft.-lb/in.) | 4.99 | 7.43 | 5.91 |
| Tensile Stress (psi) | 8930 | 10470 | 9095 |
| Tensile Elongation % | 1.27 | 1.41 | 1.47 |
| Tensile Modulus (psi × 10$^6$) | 1.72 | 1.34 | 1.45 |
| Flexure Stress (psi) | 15865 | 21300 | 20400 |
| Flexure Strain (in./in.) | 0.016 | 0.022 | 0.018 |
| Flexure Modulus (psi × 10$^6$) | 1.62 | 1.49 | 1.73 |
| Acoustic Emission (cracks) | 29 | 4 | 19 |

The above test results show that the toughness is greatly improved in the composition containing epichlorohydrin (sample 1) as is shown by the acoustic emission cracks, Gardner impact, and Izod impact test results. Other important properties such as tensile stress and flexure stress are not adversely effected. Processing characteristics such as shrink, cure rate and maturation are not significantly effected by the use of epichlorohydrin as a toughener. The significant improvements in Gardner impact and acoustic emissions were not present in the sample containing the other liquid polymer (sample 2).

EXAMPLE III

This example is presented to show the improvement in toughness imparted to a reduced weight unsaturated polyester sheet molding compound by the use of a liquid polyepichlorohydrin polymer. The reduced weight compounds contain hollow glass bubbles. The other ingredients used such as the polyester resin, low-profile additive, fillers and epichlorohydrin were the same as those used in Example I. The compositions evaluated are shown in Table III.

TABLE III

| Ingredient | Sample | |
|---|---|---|
| (Part by Weight) | 3 (Control) | 4 |
| Unsaturated Polyester Resin | 65 | 65 |
| Low-Profile Additive | 35 | 35 |
| Calcium Carbonate | 126 | 126 |
| Zinc Stearate | 4 | 4 |
| Glass Bubbles[6] | 7.5 | 7.5 |
| t-butyl Perbenzoate | 1.12 | 1.12 |
| MgO | 1.0 | 1.0 |
| Liquid Polyepichlorohydrin | — | 4 |

[6]Nominal density = 0.37; particle size = 90% by vol. between 20 and 130 microns The compositions were prepared as in Example I except that the glass bubbles were added as a filler along with the calcium carbonate. Testing results are shown in Table IV.

TABLE IV

| TEST | Sample | |
|---|---|---|
| | 3 (Control) | 4 |
| % Shrink | 0 | 0 |
| Barcol Hardness | 50 | 45 |
| Gardner Impact (in.-lb) | 8 | 12 |
| Unnotched Izod (ft-lb/in.) | 8.21 | 8.22 |
| Tensile Stress (psi) | 10790 | 10250 |
| Tensile Elongation % | 1.57 | 1.45 |
| Tensile Modulus (psi × $10^6$) | 1.55 | 1.43 |
| Flexure Stress (psi) | 20100 | 20190 |
| Flexure Strain (in./in.) | 0.021 | 0.023 |
| Flexure Modulus (psi × $10^6$) | 1.74 | 1.46 |
| Acoustic Emission (cracks) | 40 | 1 |

As in Example I, the liquid polyepichlorohydrin increased the toughness of the unsaturated polyester sheet molding compound without adversely effecting the other properties. By using polyepichlorohydrin, the acoustic emissions was dramatically reduced (from 40 to 1) which is indicative of the high toughness imparted to sample 4 by the polyepichlorohydrin.

The unsaturated polyester molding compositions of this invention have many uses including automotive parts, chairs, trays, and the like.

I claim:

1. An unsaturated polyester molding composition comprising:
   (a) an unsaturated polyester resin,
   (b) a polymerizable monomer,
   (c) from about 1 to about 30 parts by weight of an epihalohydrin polymer per 100 parts by weight of the combined weight of said unsaturated polyester resin and polymerizable monomer.

2. A composition of claim 1 wherein the epihalohydrin polymer has a number average molecular weight of from about 800 to about 50,000.

3. A composition of claim 2 containing a catalytic amount of a catalyst selected from the group consisting of benzoyl peroxide, tertiary butyl perbenzoate, cyclohexanone peroxide, tertiary butyl peroxide, tertiary butyl peroctoate, azoisobutyrodinitrile, and cumene hydroperoxide.

4. A composition of claim 3 containing fiber reinforcement wherein said fibers are selected from the group consisting of glass, nylon, polyester, and aromatic polyamide.

5. A composition of claim 4 wherein the level of said fibers is from about 5 percent to about 70 percent by weight of the total composition weight.

6. A composition of claim 4 containing a thermoplastic low profile additive.

7. A composition of claim 6 containing as a thickening agent an oxide or hydroxide of magnesium or calcium.

8. A composition of claim 7 wherein the low profile additive is a thermoplastic homopolymer of a vinylidene monomer containing from 2 to 12 carbon atoms.

9. A composition of claim 7 wherein said composition has a viscosity of from about 30,000,000 to about 100,000,000 cps.

10. A composition of claim 8 wherein the level of epihalohydrin polymer is from about 1 to about 15 parts by weight per 100 parts by weight of the combined weight of said unsaturated polyester resin and polymerizable monomer.

11. A composition of claim 10 containing glass bubbles wherein said glass bubbles have a density of less than about 0.7 gram per cubic centimeter and a particle size less than about 500 microns.

12. A composition of claim 11 wherein the epihalohydrin polymer is selected from the group consisting of a homopolymer of an epihalohydrin monomer and a copolymer of an epihalohydrin monomer and an oxide monomer containing a cyclic oxy ring.

13. A composition of claim 12 wherein the epihalohydrin polymer is a homopolymer of epichlorohydrin.

14. A composition of claim 13 wherein the fiber reinforcement is chopped glass fiber having a length of from about 0.1 to about 3 inches.

15. A composition of claim 3 wherein the epihalohydrin polymer is selected from the group consisting of a homopolymer of an epihalohydrin monomer and an oxide monomer containing a cyclic oxy ring.

16. A composition of claim 15 wherein the level of epihalohydrin polymer is from about 1 to about 15 parts by weight per 100 parts by weight of the combined weight of said unsaturated polyester resin and polymerizable monomer.

17. A composition of claim 16 wherein the epihalohydrin polymer is a homopolymer of epichlorohydrin.

18. A cured composition of claim 1.

19. A process for producing a moldable unsaturated polyester composition which comprises mixing at least one unsaturated polyester resin with at least one polymerizable monomer and from about 1 to about 30 parts by weight of epihalohydrin polymer per 100 parts by weight of the combined weight of said unsaturated polyester resin and said polymerizable monomer.

20. A process of claim 19 wherein the epihalohydrin polymer has a number average molecular weight of from about 800 to about 50,000.

21. A process of claim 20 with the added steps of
   (a) mixing a catalytic amount of a catalyst with the composition,
   (b) mixing reinforcing fibers with the composition, and
   (c) mixing a thermoplastic low profile additive with the composition.

22. A process of claim 21 with the added step of mixing a thickening agent with the composition wherein said thickening agent is an oxide or hydroxide of magnesium or calcium.

23. A process of claim 22 wherein the epihalohydrin polymer is selected from the group consisting of a homopolymer of an epihalohydrin monomer and a copolymer of an epihalohydrin monomer and an oxide monomer containing a cyclic oxy ring, and wherein the level of said epihalohydrin polymer is from about 1 to about 15 parts by weight per 100 parts by weight of the combined weight of said unsaturated polyester resin and polymerizable monomer.

24. A process of claim 23 wherein the epihalohydrin polymer is a homopolymer of epichlorohydrin.

25. A shaped article comprising:
(a) an unsaturated polyester resin,
(b) a polymerizable monomer, and
(c) from about 1 to about 30 parts by weight of an epihalohydrin polymer per 100 parts by weight of the combined weight of said unsaturated polyester resin and polymerizable monomer.

26. An article of claim 25 wherein the epihalohydrin polymer has a number average molecular weight of from about 800 to about 50,000.

27. An article of claim 26 containing fiber reinforcement wherein said fibers are selected from the group consisting of glass, nylon, polyester and aromatic polyamide.

28. An article of claim 27 wherein the level of epihalohydrin polymer is from about 1 to about 15 parts by weight per 100 parts by weight of the combined weight of said unsaturated polyester resin and polymerizable monomer.

29. An article of claim 28 containing a thermoplastic low profile additive.

30. An article of claim 29 wherein the epihalohydrin polymer is selected from the group consisting of a homopolymer of an epihalohydrin monomer and a copolymer of an epihalohydrin monomer and an oxide monomer containing a cyclic oxy ring.

31. An article of claim 30 wherein the epihalohydrin polymer is a homopolymer of epichlorohydrin.

32. An article of claim 31 wherein the fiber reinforcement is chopped glass fiber having a length of from about 0.1 to about 3 inches.

33. An article of claim 32 containing glass bubbles wherein said glass bubbles have a density of less than about 0.7 gram per cubic centimeter and a particle size less than about 500 microns.

* * * * *